United States Patent
Alessandro et al.

(10) Patent No.: US 9,765,789 B2
(45) Date of Patent: Sep. 19, 2017

(54) PUMP TESTING FOR PREDICTING LIFETIME AND WEAR CONDITIONS

(71) Applicant: Agilent Technologies, Inc., Loveland, CO (US)

(72) Inventors: Follo Alessandro, Loveland, CO (US); Flavio Cometti, Loveland, CO (US); Gianluca Buccheri, Loveland, CO (US); Jonathan Rohed, Loveland, CO (US)

(73) Assignee: Agilent Technologies, Inc., Santa Clara, CA (US)

( * ) Notice: Subject to any disclaimer, the term of this patent is extended or adjusted under 35 U.S.C. 154(b) by 1144 days.

(21) Appl. No.: 13/801,090

(22) Filed: Mar. 13, 2013

(65) Prior Publication Data

US 2014/0271106 A1 Sep. 18, 2014

(51) Int. Cl.
*F04D 19/04* (2006.01)
*F04D 27/00* (2006.01)
*F04D 27/02* (2006.01)

(52) U.S. Cl.
CPC ......... *F04D 27/001* (2013.01); *F04D 19/042* (2013.01); *F04D 27/0261* (2013.01); *F16C 2233/00* (2013.01)

(58) Field of Classification Search
CPC .. F04D 19/042; F04D 27/001; F04D 27/0261; F16C 2233/00

USPC .................................................... 415/1, 118
See application file for complete search history.

(56) References Cited

U.S. PATENT DOCUMENTS 7,112,037 B2 * 9/2006 Sabini ................. F04D 15/0088
415/1
8,082,115 B2 12/2011 Bechhoefer et al.

OTHER PUBLICATIONS

S.Y. Yoon et al.; Control of Surge in Centrifugal Compressors by Active Magnetic Bearings; Chapter 2 Introduction to Rotor Dynamics; Advances in Industrial Control, DOI 10.1007/978-1-4471-4240-9_2; Springer-Verlag London 2013; 40pp.

* cited by examiner

*Primary Examiner* — Mark Laurenzi
*Assistant Examiner* — Wesley Harris (57) ABSTRACT

System and method for testing a pump. The testing of the pump includes determining a Mechanical Power Index (MPI) for the pump. The MPI is determined by operating the pump at operating speed for a minimum operating interval. When the pump is stopped under normal operation by the application, the pump speed is continuously monitored. The time when the pump speed decreases to an initial speed close to the operating speed is read as an initial time. When the pump speed decreases to a final pump speed close to the critical speed, the end time is read and the elapsed time is determined as $\Delta t$=end time–initial time. The MPI is calculated to be the initial pump speed minus the final pump speed divided by $\Delta t$. The MPI can be used during the lifetime of the pump to determine when the pump is deteriorating.

20 Claims, 5 Drawing Sheets

PUMP TESTING FOR PREDICTING LIFETIME AND WEAR CONDITIONS

TECHNICAL FIELD

The present invention relates generally to systems and methods for testing pumps, and more particularly to systems and methods for predicting pump lifetime and wear.

BACKGROUND

Pumps are used in a variety of settings for moving liquid matter through a type of conduit made to contain the liquid (or gas). Some types of pumps have evolved into devices used in environments that require high precision and long mission times. For example, turbomolecular pumps are used to create a vacuum in a chamber. Turbomolecular pumps typically operate at high rotational speeds and may be required to operate for long periods of time in which it may move isolated molecules out of the vacuum chamber. Typically, turbomolecular pumps move the gaseous matter from the chamber into a conduit having a backing pump to assist in moving the matter completely out of the chamber. Once the vacuum forms, the pump may be required to remain on in a vacuum state to maintain the vacuum.

Like any other device, turbomolecular pumps will fail after some time in operation. The failure of a turbomolecular pump can be costly. Replacement of the pump requires a shutdown of the application in which it was operating. Where the application involves a production line, the shutdown means delays in production and reduction in volume. The failure may also cause a loss of products that would need to be disposed of if the loss of vacuum spoils the product. Similar scenarios involving added costs and inefficiencies may be present in other types of applications.

Turbomolecular pumps are currently tested for long-term lifetime ratings during the design and manufacture of the pumps. These tests however involve large sample sizes and may require long periods of time, up to a year or more, to obtain statistically significant sample sizes delaying entry into the market and adding cost to both development and manufacture. Despite all of the testing, it is still impossible to determine when any one individual pump will fail.

In view of the foregoing, there is an ongoing need for pump testing methods that predict pump failures and lifetime.

SUMMARY

In an example implementation, a method is provided for testing a pump. The testing of the pump includes determining a Mechanical Power Index (MN) for the pump. The MPI is determined by operating the pump at full operating speed for a minimum operating interval. When the pump is stopped under normal operation by the application under vacuum, the pump speed is continuously monitored. When the pump speed decreases to an initial speed close to the operating speed, the initial pump speed is stored for time t=0. When the pump speed decreases to a final pump speed close to the critical speed, the elapsed time is read and stored as t=Δt. The MPI is calculated to be the initial pump speed minus the final pump speed divided by Δt. The MPI can be used during the lifetime of the pump to determine when the pump is deteriorating.

Other devices, apparatus, systems, methods, features and advantages of the invention will be or will become apparent to one with skill in the art upon examination of the following figures and detailed description. It is intended that all such additional systems, methods, features and advantages be included within this description, be within the scope of the invention, and be protected by the accompanying claims.

BRIEF DESCRIPTION OF THE DRAWINGS

The invention can be better understood by referring to the following figures. The components in the figures are not necessarily to scale, emphasis instead being placed upon illustrating the principles of the invention. In the figures, like reference numerals designate corresponding parts throughout the different views.

DETAILED DESCRIPTION

As used herein, the term "critical speed" refers to a rotational speed of the pump at which the pump operation becomes unstable. At the critical speed, the instability of the pump has reached a level of unbalance that exceeds a threshold value.

As used herein, the term "full speed" refers to the operational speed of the pump where the pump is configured for operation at a single high speed.

Figure 1:
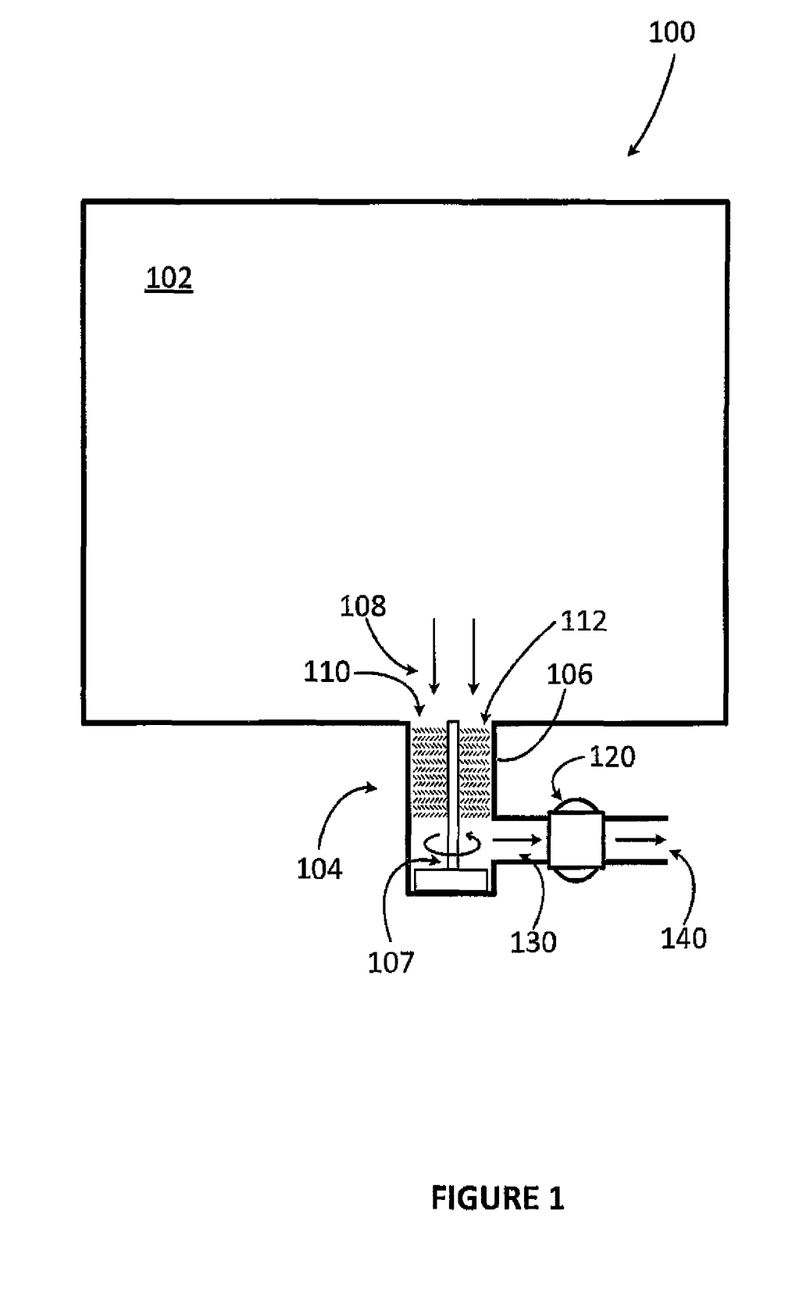
FIG. 1 is a schematic diagram of an example application that implements a pump that may be tested during life time using an example implementation of a pump test.

FIG. 1 is a schematic diagram of an example application 100 that implements a pump 104 that may be tested during life time operation using an example implementation of a pump test. The application 100 in FIG. 1 creates a vacuum in a chamber 102 using the pump 104. The pump 104 may be any suitable pump for creating a vacuum. For purposes of illustration, the pump in this description is assumed to be a turbomolecular pump. The pump 104 includes a pump chamber 110 formed by a pump housing 106. The pump chamber 110 houses a plurality of rotating blades 112 controlled by a motor 107. The pump 104 includes a bearing (not shown) to stabilize the rotational motion of the rotating blades 112.

In operation, the rotating blades 112 are rotated by the motor 107 to draw gaseous matter 108 from the chamber 102 into the pump chamber 110. The rotating blades 112 move the gaseous matter 108 into a conduit 130 that extends to a port 140 through which the gaseous matter 108 is expelled from the chamber 102 thereby creating and/or maintaining a vacuum in the chamber 102. A backing pump 120 on the conduit 130 may be added to further assist in the movement of the gaseous matter 108 through the port 140. The backing pump 120 may be a second turbomolecular pump, or any other suitable pump operating as a backing pump.

Typically, the operation illustrated in FIG. 1 involves the need to maintain the vacuum in the chamber 102 for a substantial period of time during which the pump 104 is operated at high rotational speeds. In an example implementation, the pump 104 may be controlled to perform pump tests that predict the lifetime of the pump 104 and indicate when the pump 104 is beginning to deteriorate. The pump tests allow for planned replacement of deteriorating pumps and help to avoid situations where the pump 104 fails during operation.

The pump tests may be performed while the pump 104 is on-line and in operation. The hardware and software components (described below with reference to FIG. 2) for performing the pump tests may be integrated with hardware and software provided to control the operation of the pump 104. The pump tests may also be part of a retrofit kit for inclusion into the system controlling the pump 104 after the pump 104 has been activated.

Figure 2:
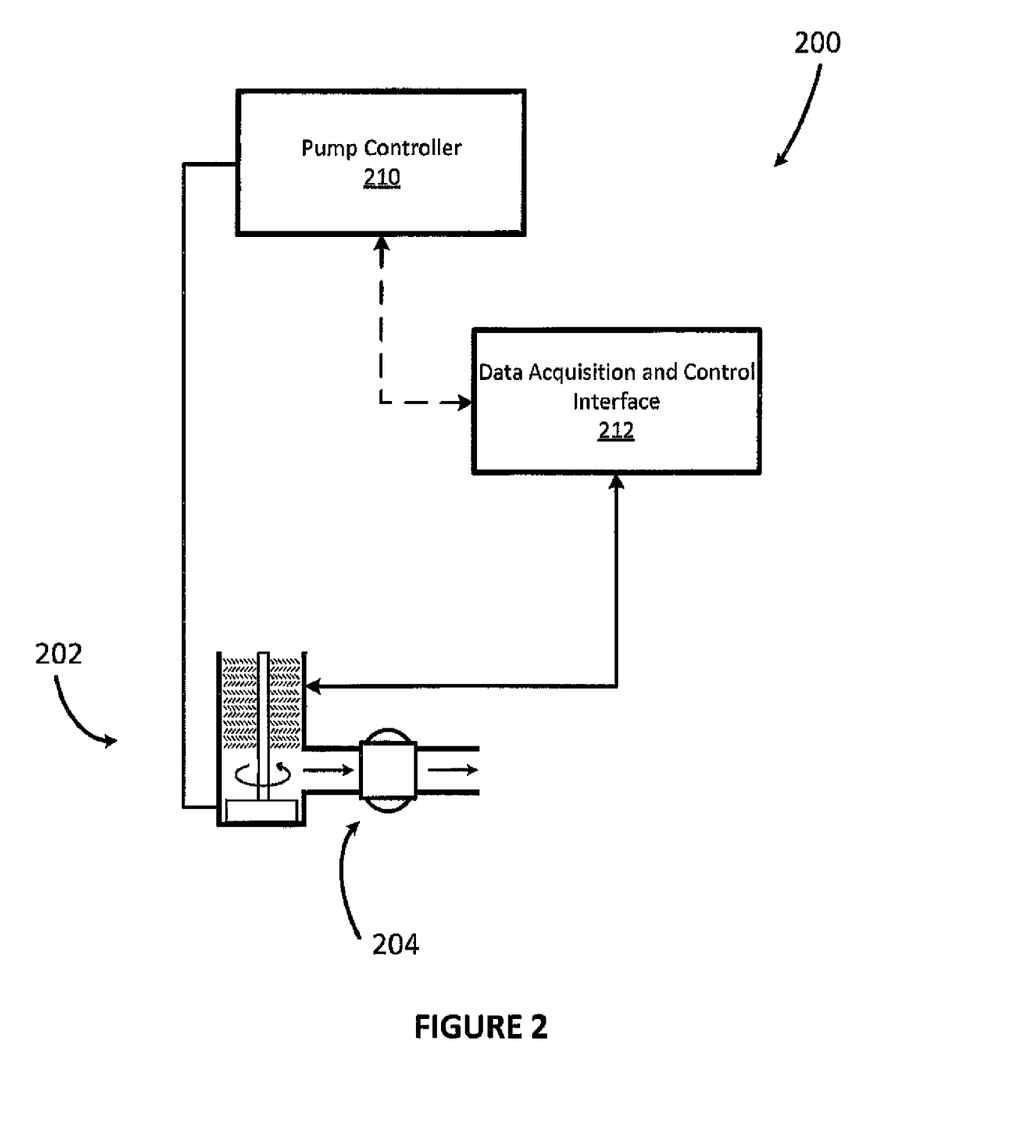
FIG. 2 is a schematic diagram illustrating operation of an example system for testing the pump during life time operation.

FIG. 2 is a schematic diagram illustrating operation of an example system 200 for testing a pump 202 during life time operation. The system 200 in FIG. 2 includes a pump controller 210 and a data acquisition and control interface 212. The pump 202 is shown configured to pump matter to a backing pump 204. The data acquisition and control interface 212 may be implemented as part of a communications interface that provides communication between the pump 202 and the pump controller 210. The data acquisition and control interface 212 includes a spin sensing signal path connected to a spin sensor mounted in the proximity of the pump 202 to sense the pump speed. In an example implementation, the spin sensor is an accelerometer.

The pump controller 210 may be configured to operate as a pump testing module that may be added to a pump already in operation in an upgrade or retrofit. The pump controller 210 may also include general pump control operations for use by a system performing the application 100 (in FIG. 1) for which the pump 202 is being used. The pump testing functions may be integrated with the general pump control operations of the pump controller 210, which may be further integrated with the pump 202 as a product. The pump testing functions may also be performed by the pump controller 210 in a high-level system control operation that is part of the application 100 requiring the vacuum in the chamber 102 in FIG. 1. The high-level system control operation may interface with the pump 202 to control the pump and to obtain information (such as the pump speed) from the pump 202.

The pump controller 210 in FIG. 2 includes pump testing functions in which a mechanical power index (MPI) is calculated and used to determine the state of the pump, whether or not it is deteriorating, and/or predict a lifetime of the pump. In the context of this description, the MPI is an index that quantifies the state of a bearing used inside the pump 202 in terms of the mechanical power while coming to a stop. The MPI may be calculated by applying a pump braking function under vacuum conditions, measuring the rotational speed of the pump 202 as the pump 202 is coming to a stop, and determining a time interval between pre-determined pump speeds. The rotational speeds measured as the pump slows may be collected and analyzed with the data used to calculate the MPI. An initial time, is identified as the time at which an initial pump speed is attained, where the initial pump speed is a pre-determined rotational speed that is close to the operational speed of the pump 202. The initial pump speed may be determined and defined for a given pump 202 for use in performing the pump test during the life time of the pump 202. For implementations in which the pump test is incorporated for operation at the beginning of the life time of the pump 202, the initial pump speed may be determined as a function of the operational speed determined for the pump 202. In implementations in which the pump test is added to pumps in operation, the initial pump speed may be determined by monitoring pump speed during operation.

During the pump test, once the initial pump speed is determined, the time until the pump speed slows to a final pump speed is measured. An end time, $t_e$, may be identified as the time at which the final pump speed is reached, where the final pump speed is a speed that is close to but greater than the critical speed. The critical speed is the speed at which the unbalance of the rotor blades results in unstable operation. The initial pump speed and the final pump speed may be determined and defined for a given pump 202 for use in performing the pump test during the life time of the pump 202. For implementations in which the pump test is incorporated for operation at the beginning of the life time of the pump 202, the initial pump speed may be determined as a function of the operational speed determined for the pump 202, and the final pump speed may be determined as a function of the critical speed determined for the pump 202. In implementations in which the pump test is added to pumps in operation, the initial pump speed and the final pump speed may be determined by monitoring pump speed during operation.

It is noted that the initial pump speed and the final pump speed are to be speeds that are "close to" the operational speed and critical speed, respectively. The actual value selected for each parameter is not significant. Pumps may be rated or characterized as having an operational speed within an expected range during the lifetime of the pump. The value of the initial pump speed may be determined to be less than the lowest expected operational speed based on the expected range. Similarly, a pump's critical speed may be expected to vary within an expected range. The value of the final pump speed may be determined to be greater than the highest expected critical speed based on the expected range.

The MPI is defined as the difference between the initial speed and the final speed divided by the elapsed time between the time, $t_i$, when the pump 202 has a speed close to the operating speed, and the time, $t_e$, when the pump speed has reached the final pump speed close to the critical speed. The MPI may be determined initially for a baseline measurement when the pump is installed or manufactured or tested prior to shipping. The MPI may be determined at a later point after the pump has been in operation for a predetermined period of time, or duty time. The second MPI measurement may then be compared to the first MPI. If the second MPI is greater than the first MPI, then the mechanical power index has increased indicating that the bearing in the pump is deteriorating.

Figure 3:
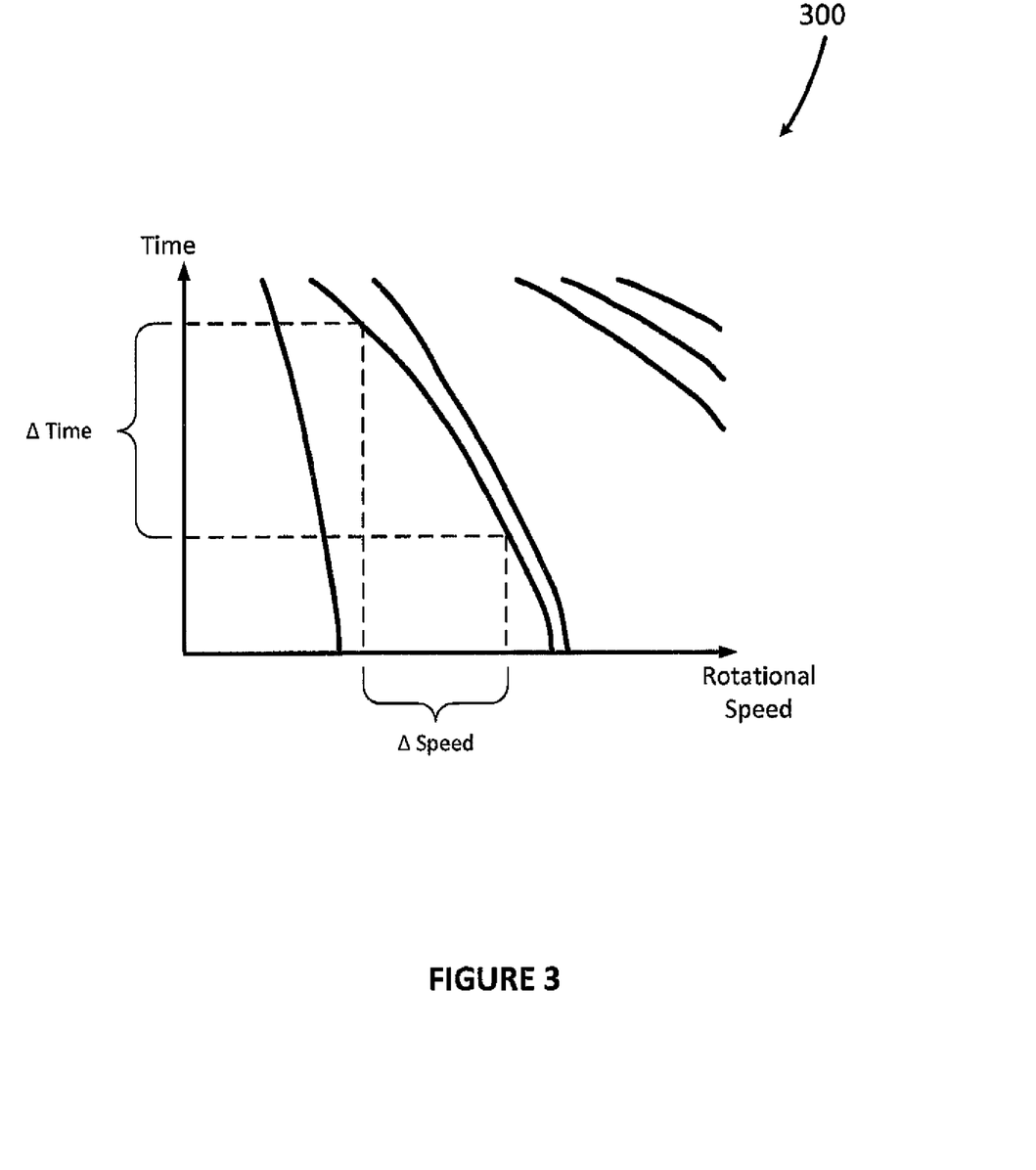
FIG. 3 is an example of a graph illustrating example results from performing the pump test described with reference to FIG. 2.

FIG. 3 is an example of a graph illustrating example results from performing the pump test described with reference to FIG. 2. The graph 300 in FIG. 3 is a plot of the rotational speeds against the corresponding times at which the rotational speeds were measured. The time values are indicated on a y-axis 302 and the rotational speeds on an x-axis 304. Each plotted curve represents a set of measurements of rotational speeds for an individual MPI measurement. The MPI may be determined for an individual pump at selected times during the life time of the pump. The selected times may be regular intervals, or any time the pump is to be stopped. In addition to determining the MPI, the time vs. speed measurements may be stored and used to construct a curve, which may be added to the graph 300 in FIG. 3. As a curve is added, the extent to which the slope of each curve continues to increase indicates the extent to which the pump 202 is wearing down at the bearing. The graph 300 in FIG. 3 may be used to provide an immediate visual indication of how the pump 202 is performing.

The measured MPIs may also be stored to preserve a historical archive illustrating the extent to which the pump 202 is deteriorating. The MPI measurements and the graph 300 in FIG. 3 may be used to predict the expected remaining lifetime of the pump 202. This data may also be combined with data from other similar pumps (such as pumps of the same model) to provide a more quantitative assessment of the expected lifetime of such pumps.

Figure 4:
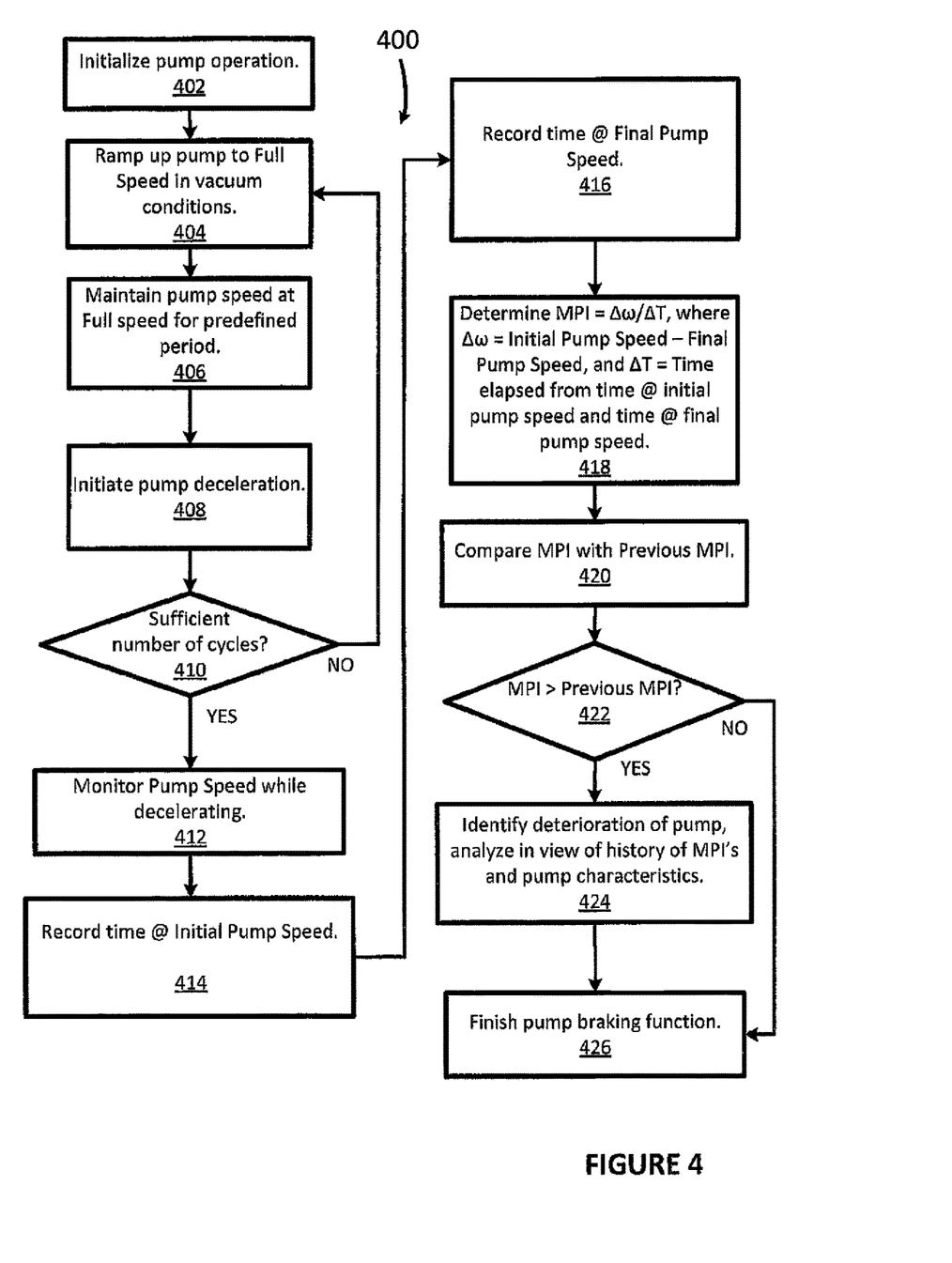
FIG. 4 is a flowchart illustrating operation of an example method for testing a pump.

FIG. 4 is a flow chart illustrating operation of an example method for testing a pump. The flowchart 400 is described below as a method performed by the system described with reference to FIG. 2. References to components not shown in FIG. 4 are to components shown in FIG. 2 unless otherwise noted.

The method illustrated by flowchart 400 may be performed after a duty time of on-line operation. At least one MPI has already been determined earlier in the pump lifetime. An initial pump speed and a final pump speed have been determined as described above with reference to FIG. 2. The method illustrated by flowchart 400 may be initiated at step 402 for normal operation of the pump 202. The pump controller 210 may initialize operation of the pump 202 and operate the pump 202 as required by the application. During operation of the pump 202, a pump braking function under vacuum, or a specific request for testing by determining an MPI may initiate the steps for determining the MPI. At step 404, the pump 202 is ramped up to full operating speed in a vacuum condition. Step 404 may represent normal operation before the pump braking function, or request for testing, is initiated. The MPI measurement process may include a pre-measurement automatic cycle performed a pre-determined number of times. The pre-measurement automatic cycle may be performed for the pre-determined number of times to obtain a stable and optimal grease distribution inside the bearings.

The pre-measurement automatic cycle may involve three phases of pump operation. The first phase is to ramp up the pump 202 to full operating speed. The second phase is to maintain the full operating speed for a pre-defined length of time. The third phase is to decelerate the pump under vacuum conditions. In the method illustrated by the flowchart 400 in FIG. 4, step 404 may represent the first phase. At step 406, the pump is maintained at full operating speed for a predefined period of time thereby implementing the second step. At step 408, the pump braking function is applied and the pump begins to decelerate for the third phase.

The pre-measurement automatic cycles are performed a predefined number of times for a predetermined amount of time. In one example, the pre-measurement automatic cycles may be performed 8 times over a period of 18 hours. The number of cycles and amount of time may vary from pump to pump.

At decision block 410, a check is performed to determine if a sufficient number of pre-measurement automatic cycles have been performed. If not, the 'NO' path of decision block 410 transfers control to step 404. If a sufficient number of cycles have been performed along the 'YES' path of decision block 410, control is transferred to step 412 for monitoring the pump speed while decelerating as the pump braking function is performed.

It is noted that the flowchart 400 in FIG. 4 describes performing the function of determining the MPI by identifying the needed data parameters as the pump 202 is in the process of decelerating. Alternatively, the pump 202 may be permitted to decelerate while the rotational speed of the pump 202 is measured at fixed time intervals, and to collect the rotational speeds for each time interval until the pump 202 stops. The rotational speeds and time intervals may then be analyzed to determine the data parameters to be used for determining the MPI.

At step 414 in FIG. 4, an initial time at which an initial pump speed is measured is identified to be $t_i$. Step 414 uses the predetermined initial pump speed for all determinations of the MPI to provide reproducibility in the results.

At step 416, as the pump continues to decelerate and an elapsed time is recorded when the pump speed is measured to be a final pump speed. The final pump speed is defined to be a pump speed that is close to the critical speed of the pump 202. Step 416 uses the predetermined final pump speed for all determinations of the MPI.

At step 418, the MPI is determined by calculating the difference between the initial pump speed and the final pump speed and dividing the difference in pump speeds by the elapsed time between attaining the initial pump speed and the final pump speed. At step 420, the MPI is compared to a previous MPI to determine if the pump bearings are deteriorating. At decision block 422, the MPI is checked to see if it is greater than a previous MPI. If the MPI is greater than an earlier MPI, the pump 202 is identified as having a deteriorating bearing at step 424. Analysis of the measured MPI in step 424 may be performed in view of the history of MPIs for a pump during its lifetime as described with reference to FIG. 5. At step 426, the pump deceleration is complete as the braking function is completed.

Figure 5:
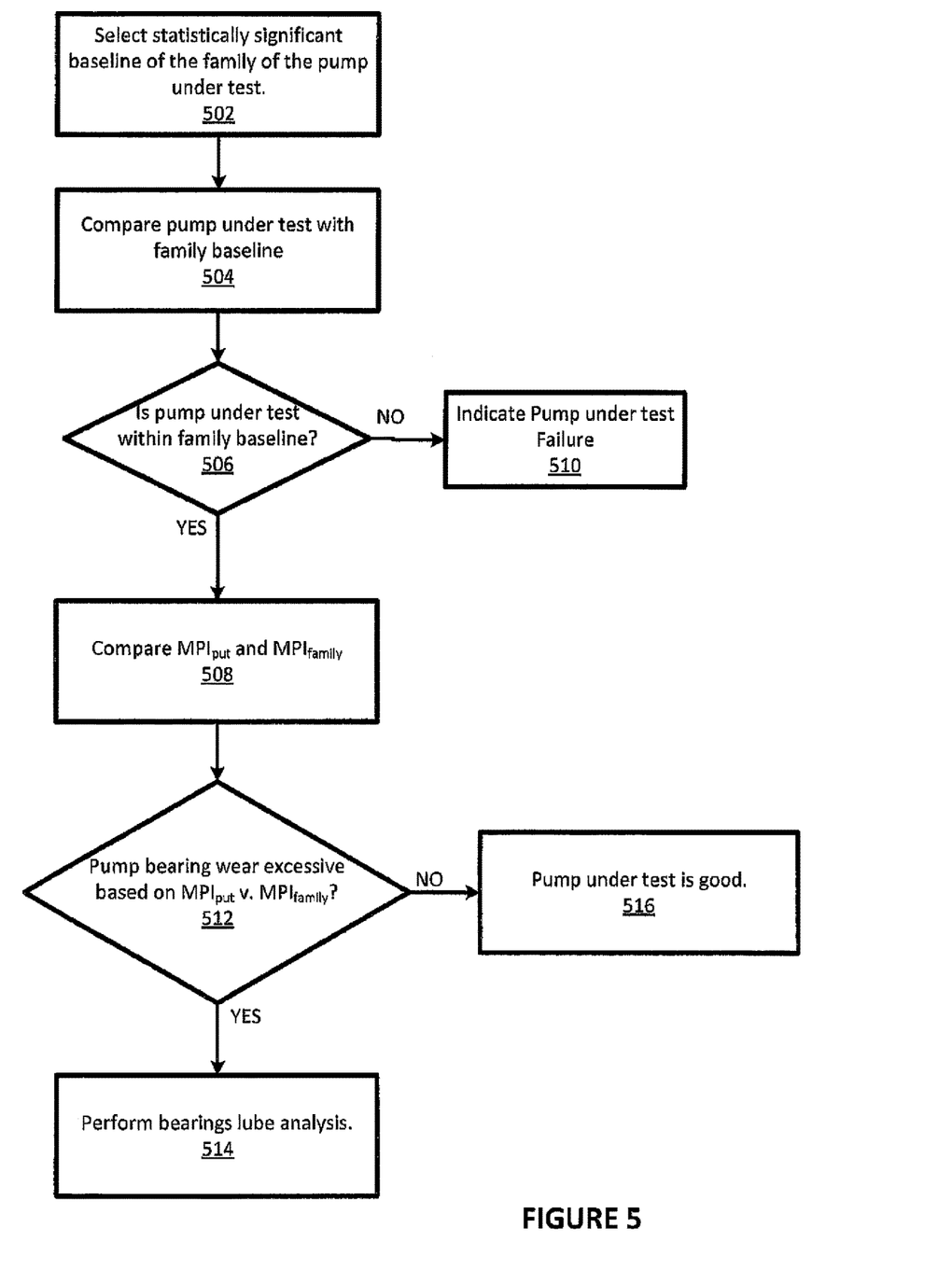
FIG. 5 is a flowchart illustrating analysis of data acquired during a pump test.

FIG. 5 is a flowchart illustrating analysis of data acquired during a pump test. At step 502, a statistically significant baseline may be determined for the family of pumps to which the pump belongs. The baseline may be an MPI value determined from MPI values of a sample of pumps from the same family as the pump under test that are operating well within the performance specifications for the pump family. The pump samples of the same family may be pumps in the same product line, classification, or other suitable category. The MPI of the pump under test, $MPI_{put}$, is compared with the baseline MPI for the pump family at step 504. If the MPI for the pump under test is not within the MPI baseline for the pump family as determined at decision block 506, the pump under test is deemed to have malfunctioned at step 510. If the pump under test is within the baseline, the measured MPI for the pump under test, $MPI_{put}$, is compared with a broader MPI for the pump family at step 508. The MPI for the family, $MPI_{family}$, may be based on historical data of MPI measurements for all pumps in the family that are deemed to have pump life remaining. Decision block 512 determines if the comparison of the $MPI_{put}$ with the $MPI_{family}$ indicates that the pump bearing of the pump under test is not excessively worn, the pump under test is deemed to have operational lifetime remaining at step 516. If the comparison at decision block 512 determines that the wear of the pump under test is excessive, further testing may be performed. For example, a bearing lube analysis may be performed. The analysis in step 516 may include thermogravimetric analysis (TGA), for example.

It will be understood that various aspects or details of the invention may be changed without departing from the scope of the invention. Furthermore, the foregoing description is for the purpose of illustration only, and not for the purpose of limitation—the invention being defined by the claims.

What is claimed is:
1. A method for testing a pump, the method comprising:
  operating the pump at an operating speed for a minimum operating interval, the pump comprising a pump bearing supporting rotational motion of the pump at the operating speed;

initiating a pump braking function;
continuously monitoring pump speed starting at initiation of the pump braking function, by operating a sensor configured to sense pump speed;
reading an initial time, $t_i$, when the pump speed decreases to an initial pump speed close to and less than the operating speed;
storing the initial pump speed for time $t_i$;
reading an end time, $t_e$, when the pump speed decreases to a final pump speed close to and greater than a critical speed;
determining a mechanical power index (MPI) as:

MPI=initial pump speed–final pump speed/$t_e$–$t_i$;

using the MPI to determine a state of deterioration of the pump or the pump bearing, whereby using the MPI to determine the state of deterioration of the pump or the pump bearing increases the efficiency of testing the pump; and
based on the determined state of deterioration,
outputting an indication that the pump or the pump bearing is deteriorating or should be replaced.

2. The method of claim 1 further comprising:
before the step of initiating the pump braking function, performing a pre-measurement automatic cycle comprising the steps of:
ramping the pump speed up to the operating speed;
maintaining the pump speed at the operating speed for a full speed phase time; and
decelerating the pump; and
repeating the pre-measurement automatic cycle a predetermined number of times.

3. The method of claim 2 further comprising:
performing the steps of ramping, maintaining and decelerating the pump in a vacuum condition.

4. The method of claim 1, where the sensor comprises an accelerometer positioned proximate to the pump, and continuously monitoring the pump speed comprises:
reading an accelerometer output value from the accelerometer.

5. The method of claim 1 further comprising:
generating a graph of time vs. rotational speed by acquiring a plurality of rotational speed values at fixed intervals in time for a time period greater than an elapsed time $\Delta t=t_e-t_i$, and plotting the plurality of rotational speed values at the corresponding fixed intervals in time.

6. The method of claim 1 further comprising:
performing the step of operating the pump for the minimum operating interval in a vacuum condition.

7. The method of claim 1 where the step of using the MPI to determine the state of deterioration of the pump or the pump bearing comprises:
operating the pump over a duty time;
after the duty time, repeating the steps for performing the pump test to calculate a second MPI;
comparing the second MPI and the first MPI; and
indicating a deteriorating state for the pump or the pump bearing if the second MPI is greater than the first MPI.

8. A method for controlling a pump, the method comprising:
initializing the pump for operation in an application, the pump comprising a pump bearing;
performing a pump test by calculating an initial MPI by performing the steps of:
operating the pump at an operating speed for a minimum operating interval;
initiating a pump braking function;
continuously monitoring pump speed starting at initiation of the pump braking function, by operating a sensor configured to sense pump speed;
reading an initial time, $t_i$, when the pump speed decreases to an initial pump speed close to and less than the operating speed;
storing the initial pump speed for time $t_i$;
reading an end time, $t_e$, when the pump speed decreases to a final pump speed close to and greater than a critical speed;
determining a mechanical power index (MPI) as:

MPI=initial pump speed–final pump speed/$t_e$–$t_i$;

using the MPI to determine a state of deterioration of the pump or the pump bearing, whereby using the MPI to determine the state of deterioration of the pump or the pump bearing increases the efficiency of testing the pump; and
based on the determined state of deterioration,
outputting an indication that the pump or the pump bearing is deteriorating or should be replaced
replacing the pump or the pump bearing.

9. The method of claim 8 further comprising:
before the steps of performing the pump test, performing a pre-measurement automatic cycle comprising the steps of:
ramping the pump speed up to the operating speed;
maintaining the pump speed at the operating speed for a full speed phase time; and
decelerating the pump; and
repeating the pre-measurement automatic cycle a predetermined number of times.

10. The method of claim 9 further comprising:
performing the steps of ramping, maintaining and decelerating the pump in a vacuum condition.

11. The method of claim 8, where the sensor comprises an accelerometer positioned proximate to the pump, and monitoring the pump speed comprises:
reading an accelerometer output value from the accelerometer.

12. The method of claim 8 further comprising after each pump test:
generating a graph of time vs. rotational speed by acquiring a plurality of rotational speed values at fixed intervals in time for a time period greater than an elapsed time $\Delta t=t_e-t_i$, and plotting the plurality of rotational speed values at the corresponding fixed intervals in time.

13. The method of claim 8 further comprising:
performing the step of operating the pump for the minimum operating interval in a vacuum condition.

14. The method of claim 8 where the step of using the MPI to determine the state of deterioration comprises:
operating the pump over a duty time;
after the duty time, repeating the steps for performing the pump test to calculate a second MPI;
comparing the second MPI and the first MPI; and
indicating a deteriorating state for the pump or the pump bearing if the second MPI is greater than the first MPI.

15. A system for performing a pump test, the system comprising:
an electronics-based pump controller configured to execute a pump test, to transmit command signals configured to communicate pump control functions to a pump via a communications interface, and to process data received from the pump via the communications interface, wherein the pump comprises a pump bearing;

a data acquisition and control interface configured to communicate between the pump and the pump controller over the communications interface, the data acquisition and control interface comprising a speed sensing signal path to a speed sensor mounted in proximity to the pump to sense a pump speed; and a sensor communicating with the data acquisition and control interface and configured to sense pump speed, wherein the pump controller is programmed to:

calculate an MPI;

operate the pump at an operating speed for a minimum operating interval;

initiate a pump braking function;

continuously monitor pump speed starting at initiation of the pump braking function by operating the sensor;

read an initial time, $t_i$, when the pump speed decreases to an initial pump speed close to and less than the operating speed;

store the initial pump speed for time $t_i$;

read an end time, $t_e$, when the pump speed decreases to a final pump speed close to and greater than a critical speed;

determine a mechanical power index (MPI) as:

MPI=initial pump speed−final pump speed/$t_e$−$t_i$; and use the MPI to determine a state of deterioration of the pump or the pump bearing whereby using the MPI to determine the state of deterioration of the pump or the pump bearing increases the efficiency of testing the pump; and based on the determined state of deterioration, output an indication that the pump or the pump bearing is deteriorating or should be replaced.

16. The system of claim 15 wherein the pump controller is further programmed to perform a pre-measurement automatic cycle prior to calculating the MPI.

17. The system of claim 16, wherein the pre-measurement automatic cycle comprises the steps of:

ramping the pump speed up to the operating speed;

maintaining the pump speed at the operating speed for a full speed phase time; and decelerating the pump; and repeating the steps of ramping the pump speed, maintaining the pump speed, and decelerating the pump a predetermined number of times.

18. The system of claim 15 where the pump test further comprises steps of:

after a duty time in which the pump is operated at the operating speed, repeating the steps for the MPI to calculate a second MPI;

comparing the second MPI and the first MPI; and indicating a deteriorating state for the pump or the pump bearing if the second MPI is greater than the first MPI.

19. The system of claim 15 where the pump controller is configured to perform pump control functions to operate the pump in an application.

20. The system of claim 15 where the pump controller is configured to store the MPI in memory with previously measured MPIs for the pump.

* * * * *